Patented Oct. 7, 1952

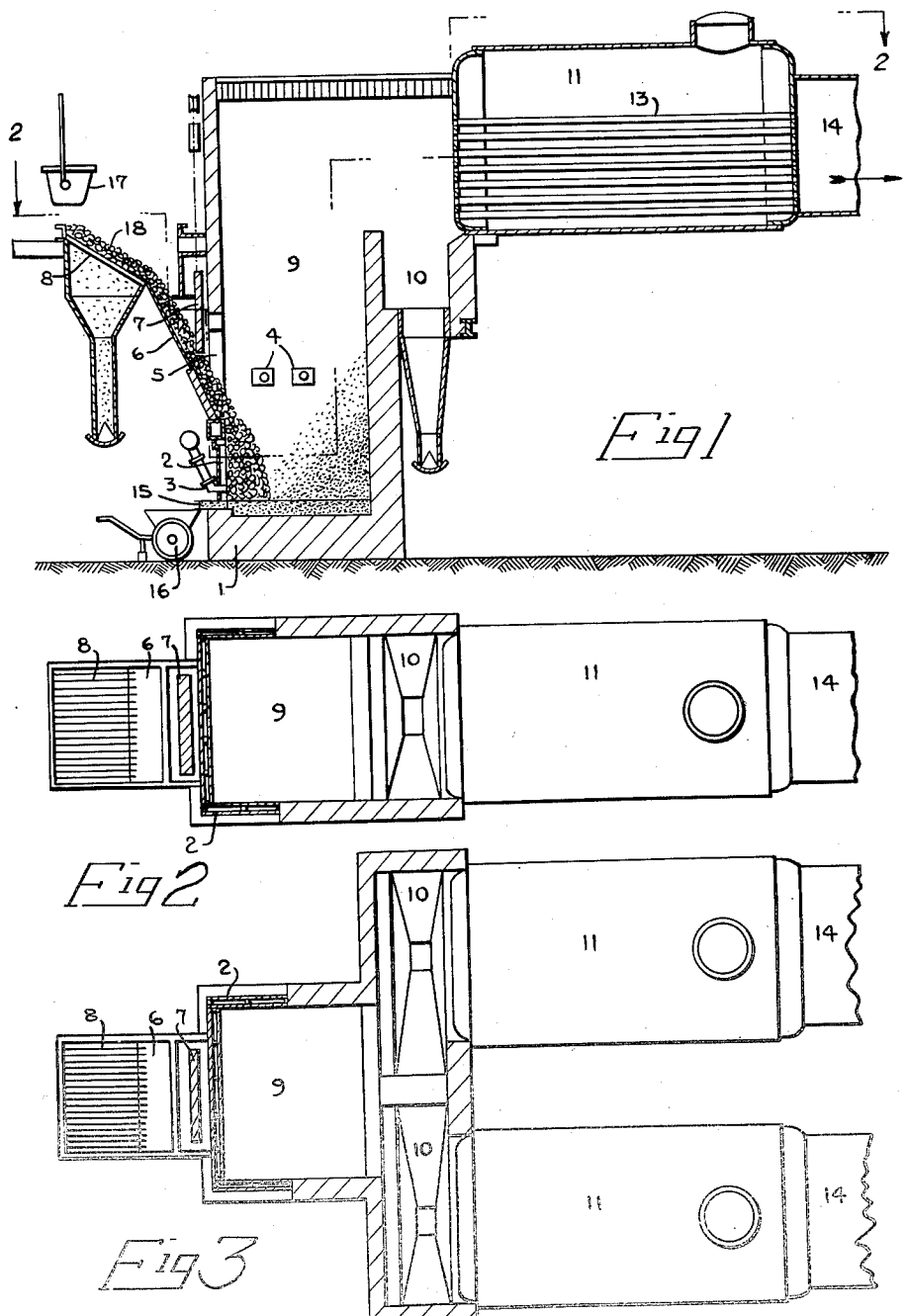

2,613,137

UNITED STATES PATENT OFFICE 2,613,137

FURNACE FOR THE RECOVERY OF METAL OXIDES

Hans-Joachim Hellwig, Oker/Harz, Germany, assignor to Unterharzer Berg- und Huttenwerke G. m. b. H., Oker/Harz, Germany Application September 8, 1949, Serial No. 114,657
In Germany October 1, 1948

5 Claims. (Cl. 23—277)

The invention relates to the manufacture of metal oxides suitable for use as components of colors.

It is known to produce metal oxides of this type from poor copper ores and intermediary metallurgical products whereby at the same time a copper matte results which contains the noble metals present in the initial charge.

In conformity with the so-called "roasting furnace" process materials containing easily volatile metals are mixed with reducing substances and fuel, charged as a thin layer on grates and heated to above the evaporation point of the metals or metal combines contained in the charge. The volatile metallic products are removed with the furnace gases and separated from the latter in any known manner. Since the charge is applied as a thin layer the furnace is operated with a large surplus of air; accordingly the produced metal vapors such as zinc or lead sulfide vapors are thoroughly oxidized and obtained in a state which is most appropriate for their use in the manufacture of colors. However, these roasting furnaces are only workable as comparatively small units and their successful operation depends greatly upon a careful preparation of the charge.

The volatilization of metals may also be effected in a blast or shaft furnace the non-volatile components of the charge being liquefied and separated into a slag and a matte containing the noble metals present in the charge. In these furnaces the gaseous products must pass through a high column of the charge in admixture with a large quantity of unburnt components, such as metal vapors and carbon monoxide; these products, therefore, require for their combustion the carefully controlled admixture of secondary air. Moreover, due to the unavoidable and highly unwelcome formation of lumps on the walls of the blast furnaces and the very troublesome creation of volatile ashes the operating conditions of these furnaces vary greatly and a continuous production of metal oxides which are suitable for the production of colors cannot be maintained. Last, but not least, the operation of the customary shaft and roasting furnaces for the production of metal oxides greatly depends on the skill of the attendants.

Metal oxides are also produced in rotatable drum furnaces; these oxides are only usable for the manufacture of colors after they have been submitted to a complicated purifying procedure; the formation of wall lumps is also a troublesome experience with rotary drum furnaces.

It is the primary object of this invention to provide a blast furnace for the production of metal oxides which is successfully usable for the manufacture of colors and which eliminates the above-described drawbacks and operational difficulties.

It is also an object of this invention to effect in the furnace a complete oxidation of the herein produced volatile metals and to avoid the formation of wall lumps from the volatile ashes.

It is a further object of the invention to provide a blast furnace which can be operated as a large unit and does not rely for its proper operation upon the skill of the furnace attendants.

A particular advantage of this blast furnace is a surprising reduction of the fuel consumption and its mechanized operation.

Moreover, the instant furnace enables due to its organic cooperation with a steam generator a complete precipitation of the produced metal oxides and a remarkable utilization of the waste heat of the flue gases.

The invention is by way of example illustrated in the attached drawing showing a blast furnace for the simultaneous recovery of metal oxides and of a matte containing copper and noble metals if present in the charge from poor ores and inferior intermediary metallurgical products.

In the drawings

Fig. 1 is a vertical sectional view of the furnace,

Fig. 2 is a part sectional and part plan view on line 2—2 of Fig. 1,

Fig. 3 is a view similar to Fig. 2 of a further modification of the furnace.

A typical feature of the furnace which is charged from the front is the cooperation of the furnace shaft with a large capacity chamber forming the upper extension of the shaft; this chamber promotes the complete oxidation of the volatile metals and other oxidizable gaseous products; the cooperation of the shaft and this chamber is further enhanced by the attachment of a steam generator to the chamber which steam generator serves to complete the precipitation and collection of the metal oxides; the waste heat of the flue gases passing from the chamber is at the same time utilized for the generation of steam.

The furnace and its operation will now be described in detail.

The furnace comprises a vertical shaft 1 which preferably has a rectangular cross section having its front wall at the left side of the drawing. A water jacket 2 is located in the bottom portion of the shaft wall in such a manner that it extends through about one-half of the shaft circumference, Fig. 2. A tap hole 15 is provided in the shaft underneath the water jacket for the discharge of the molten products of the furnace operation into wheel barrow 16.

Air is supplied to the lower portion of shaft 1 through the nozzles 3 which pass through the water jacket 2. Secondary air is entered into the shaft through nozzles 4 located above the water jacket.

The furnace shaft is charged from the front and not from above. The charge 18 consisting predominantly of volatile metals containing ores or intermediary metallurgical products and reducing materials is fed from a traveling hopper 17 onto an inclined funnel or chute 6 and from here through the opening 5 of the furnace wall; the passage of the charge over the chute is controlled by a vertically movable slide 7.

The charge 18 passes over the chute as a steep layer by gravity in conformity with the progress of the furnace operation. After the desirable thickness of the charge layer 18 has once been adjusted it need not be changed; a very welcome continuity of the furnace operation is hereby assured. A screen 8 for the separation of the fines may form the first part of the chute.

A large capacity oxidizing and precipitating chamber 9 forming a typical feature of this invention is located on the upper end of the shaft and therefore forms an upper extension of the same. This chamber 9 has a larger cross section than the shaft 1; the deposition of the flue ashes and the combustion of the exhaust gases is effected through the action of this chamber. In contradistinction to a customary shaft furnace where the shaft has a throughout equal cross section the chamber 9 is independent upon the size of the shaft and may therefore have any desirable capacity.

A steam generator 11 is built into the gas discharge opening 14 of the chamber 9 and the heating tubes 13 of the boiler form the exhaust tubes of the furnace. The metal oxides which are solidified and deposited in chamber 9 fall into the the collector shaft 10 and the residual portion of these metal oxides deposited in the boiler tubes 13 is pushed from these tubes into the collector 10.

The exhaust gases of the furnace travel through the steam generator and escape through flue 14. In order to increase the depositing capacity a plurality of steam generators 11 may be provided as shown in Fig. 3.

In the operation of this furnace the height or thickness of the steep charge layer traveling downward on chute 6 is so controlled that upon the entrance of the charge into the furnace through opening 5 and its arrival on the bottom of the shaft the distance between the nozzles 3 and the opposite outer face of the charge varies between 60 to 100 centimeters. If this distance is maintained the escaping gases will have a maximum temperature and the formation of lumps at the shaft wall caused by premature temperature reduction is hereby prevented. On the other hand, the furnace preserves its full function as a melting unit insofar as the residual position of the charge from which volatile metals such as zinc, cadmium, lead and the like have been separated is properly melted. This molten residue may be continuously tapped from discharge hole 15 and may be, for instance, separated in overflow crucibles in a matte and a slag.

Secondary air is introduced through nozzles 4 to guarantee complete oxidation and combustion of the volatile products. Only if this oxidizing action is complete, the formed metal oxides attain characteristics which render them highly useful for the manufacture of colors.

The flue gases contain particularly at the commencement of the furnace operation a certain fraction of flue ashes mainly consisting of carbonaceous particles. Since the chamber 9 is very spacious and the flow speed of the gases is accordingly reduced these ashes deposit quickly and do not reach the boiler.

Experience has proven that the temperature in the chamber suffices to reduce and to revolatilize the metals from the mixture consisting of the carbon containing flue ashes and the metal oxides; the non-volatile molten residue is discharged through tap hole 15. Current work costs otherwise caused by the disposal of flue ashes or the removal of lumps from the walls are saved.

The concentration of the heat in the spacious chamber 9 of the blast furnace which has a possibly small radiation surface has improved the utilization of the exhaust heat to about 50 per cent as compared with equal working conditions in customary roasting or shaft furnaces.

In conformity with Figure 3 the chamber 9 is provided with a lateral extension 18 and two steam generators 11 are connected with this extension; two collector shafts 10 are in this case attached to the bottom of the chamber extension 18.

The operation of this furnace will now be illustrated by the following detailed example.

Slags taken from a lead producing shaft furnace and containing 16 to 24 per cent zinc, 1 to 3 per cent lead, 1 to 1.5 per cent copper, 20 to 60 grams Ag per ton, and zinc distillation residues containing 6 to 10 per cent Zn, 4 to 6 per cent Pb, 1 per cent Cu, 180 grams per ton Ag, 1 gram per ton An, 30 per cent C are milled and briquetted by admixture of peat. The carbon content of the zinc distillation residues replaces a portion of the coal required for the reduction.

The briquettes are charged in the blast furnace in admixture with up to about 8 per cent coarse coke; the coke may be entirely or partly replaced by the distillation residues. By raising the temperature to about 1300° C. the volatilization of the zinc and lead content of the charge and the liquefaction of the residues is carriedout satisfactorily.

The instant blast furnace may be operated as a boiler, the combustion with coke or other cheap fuel being carried-out similarly to a generator eventually with admixture of steam; the ashes are liquefied by admixture of suitable materials and discharged from time to time in the customary manner.

The invention has beeen described with reference to a preferred embodiment and it will be understood that many variations and modifications thereof may be resorted to without departure from the scope of the invention as defined in the following claims.

I claim:

1. In a furnace for the recovery of volatile metal oxides, a water jacket surrounding substantially one-half of the bottom portion of the furnace, a feed opening in a wall of the furnace above said water jacket, a chute extending downwardly towards said opening and being inclined to direct the charge into the preheated one-half of said bottom portion, a slide closure in said opening above said chute adjustable to control the quantity of charge flowing through said opening on said chute, the top portion of said furnace being enlarged to form a chamber for the flue gases, a horizontal discharge flue connected to said enlarged top portion, a boiler in said discharge flue of which the horizontal heating flues freely extend into said enlarged top portion and a vertical collector shaft for the flue dust attached to the bottom portion of said chamber and located between the latter and the boiler.

2. In a furnace for the recovery of metal oxides, a water jacket surrounding substantially one-half of the bottom portion of the furnace, a feed opening in a wall of the furnace above said water jacket, a chute extending downwardly towards said opening and inclined so as to direct the charge into the preheated half of said bottom portion, a slide closure in said opening above said chute adjustable to control the quantity of charge flowing through said opening on said chute, the top portion of said furnace being enlarged, airblast nozzles extending through said water jacket, secondary airblast nozzles located approximately at the height of the feed opening and a discharge opening for gaseous products in the furnace wall of said enlarged portion and at least one collector shaft attached to the bottom portion of said enlarged furnace portion.

3. In a furnace according to claim 2, the upper end portion of the chute being shaped to form a screen.

4. In a furnace according to claim 2, a discharge opening for molten products located in the wall of the furnace underneath the water jacket.

5. In a furnace for the recovery of metal oxides, a water jacket surrounding substantially one-half of the bottom portion of the furnace, a feed opening in a wall of the furnace above said water jacket, a chute extending downwardly towards said opening and inclined so as to direct the charge into the preheated half of said bottom portion, a slide closure in said opening above said chute adjustable to control the quantity of charge flowing through said opening on said chute, the top portion of said furnace being enlarged, airblast nozzles extending through said water jacket, secondary airblast nozzles located approximately at the height of the feed opening and a discharge opening for gaseous products in the furnace wall of said enlarged portion.

HANS-JOACHIM HELLWIG.

REFERENCES CITED

The following references are of record in the file of this patent:

UNITED STATES PATENTS

| Number | Name | Date |
|---|---|---|
| 1,923,084 | Gillette | Aug. 22, 1933 |
| 1,933,254 | Goodell | Oct. 31, 1933 |
| 1,973,697 | Bailey | Sept. 18, 1934 |
| 1,973,705 | Hardgrove et al. | Sept. 18, 1934 |
| 2,050,400 | Wagner | Aug. 11, 1936 |
| 2,063,229 | Corriston | Dec. 8, 1936 |